United States Patent [19]

Vitous

[11] 4,158,330
[45] Jun. 19, 1979

[54] DUAL VENTED BREWER

[75] Inventor: Charles J. Vitous, Berwyn, Ill.

[73] Assignee: Cory Food Services, Inc., Chicago, Ill.

[21] Appl. No.: 930,814

[22] Filed: Aug. 2, 1978

[51] Int. Cl.² .............................................. A47J 31/00
[52] U.S. Cl. ......................................... 99/295; 99/307
[58] Field of Search ................. 99/280, 281, 282, 288, 99/291, 295, 300, 304, 307, 316, 283

[56] References Cited

U.S. PATENT DOCUMENTS

| 3,336,856 | 8/1967 | Martin | 99/300 |
|---|---|---|---|
| 3,463,075 | 8/1969 | Wickenberg | 99/282 |
| 3,494,276 | 2/1970 | Martin | 99/282 |
| 4,083,295 | 4/1978 | Hollingsworth | 99/295 |

*Primary Examiner*—Robert W. Jenkins
*Attorney, Agent, or Firm*—Wegner, Stellman, McCord, Wiles & Wood

[57] ABSTRACT

A coffee brewing apparatus having a plurality of water heating devices connected in series for sequentially heating water to a beverage brewing temperature. Each of the devices is provided with a vent. The individual vents are brought to adjacent the brewing cartridge for discharging vented fluids thereinto during operation of the coffee brewer. The outlet of the water heating structure is connected to an inlet to the brewing cartridge and the vent conduits are connected adjacent the water delivery inlet. The vent conduit may be formed of synthetic resin. The vents may extend horizontally outwardly from the water heating devices and may extend vertically downwardly to the cartridge brewing chamber.

7 Claims, 3 Drawing Figures

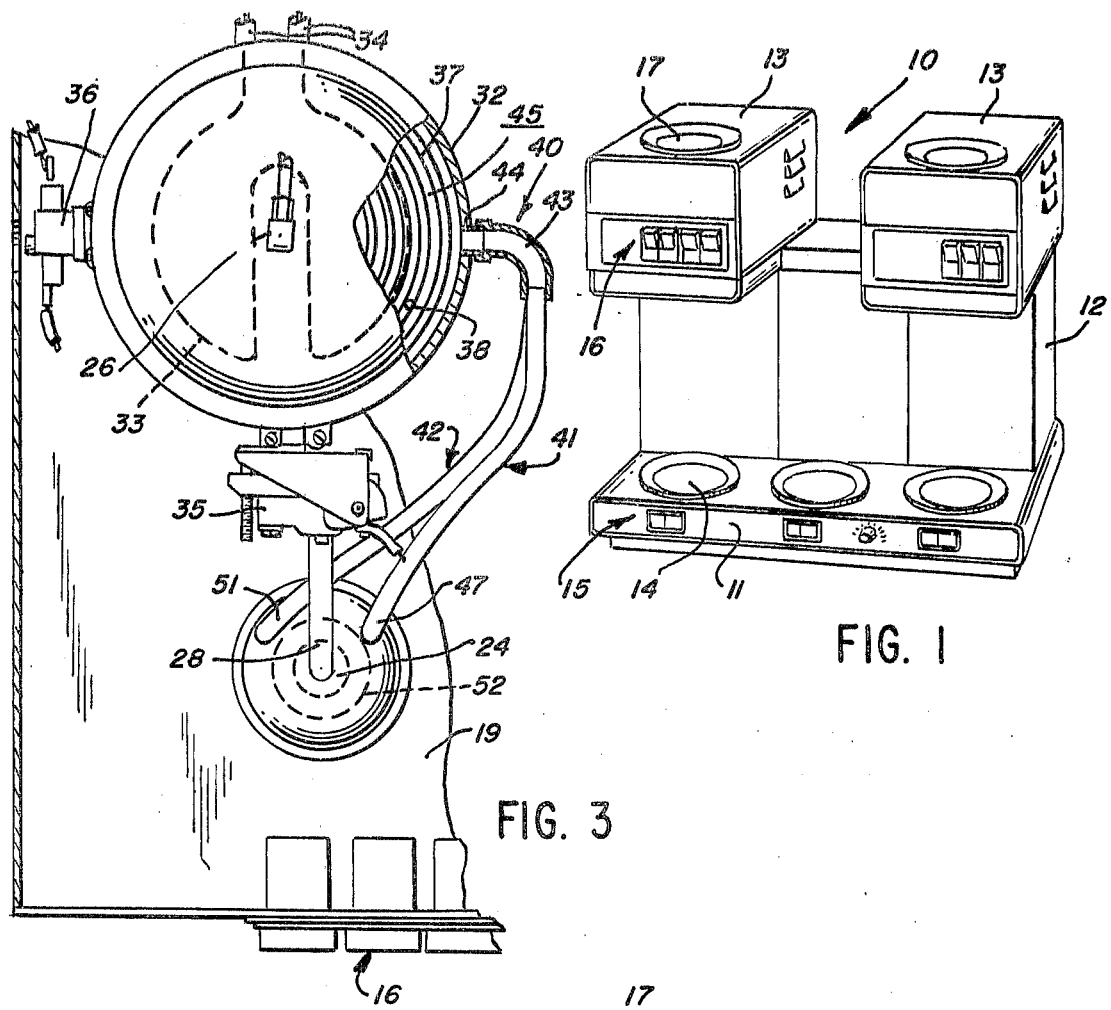
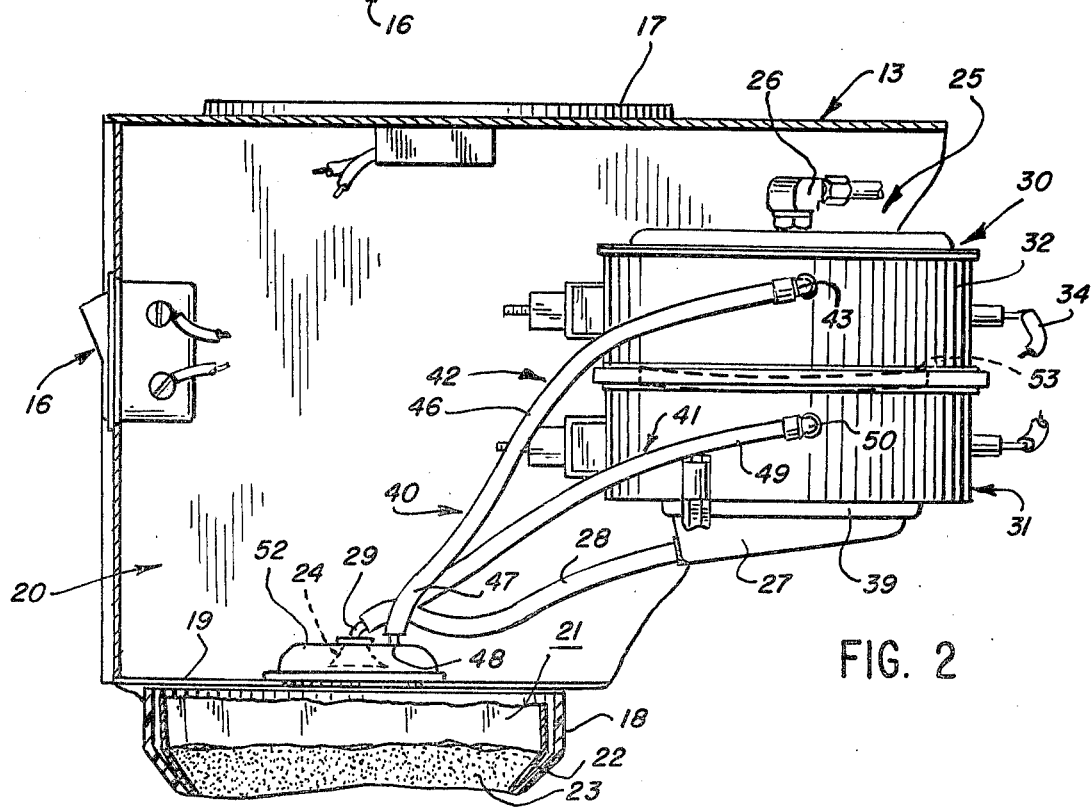

DUAL VENTED BREWER

BACKGROUND OF THE INVENTION

1. Field of the Invention

This invention relates to beverage brewers and in particular to means for venting a plurality of coacting water heating devices in a beverage brewer.

2. Description of the Prior Art

In one form of improved beverage brewer, water is heated to a brewing temperature by means of a heat transfer device defined by a relatively massive element heated by a suitable heating element, such as an electrical heating element. The water, in flowing in heat transfer association with the heat transfer mass, absorbs thermal energy and is delivered downwardly therefrom for use in brewing a beverage in an associated brewing cartridge.

To maximize the efficiency of the apparatus, the heating of the heat transfer mass is conventionally caused to provide a temperature which, if the water were to flow at a lower than desired rate, could produce steam. Thus, it is desirable to provide in such an "instantaneous-type" heat transfer means some means for venting the structure to dissipate such generated steam and other gases.

It has further been contemplated to provide such heating devices as a stacked series of individual heating devices which progressively heat the incoming water to successively higher temperatures until the final desired brewing temperature is reached in the final of the plurality of heating devices.

SUMMARY OF THE INVENTION

The present invention comprehends an improved coffee brewer structure wherein a plurality of vent means are provided for venting each of the heating devices individually.

The invention comprehends the provision of conduit means for effecting the venting of the individual heating devices to the brewing chamber space. Thus, any liquid which may be generated in the venting operation is automatically delivered to the brewing space for use in the brewing operation.

The delivery of the hot brewing water may be at a delivery portion of the brewing means and the vent means may be arranged to conduct the vented gases into the brewing space adjacent the brewing water inlet. In the illustrated embodiment, the vent conduits comprise synthetic resin tubes.

In the illustrated embodiment, the vent means define horizontal outlets from the water heating devices and vertical connections at the cartridge.

BRIEF DESCRIPTION OF THE DRAWING

Other features and advantages of the invention will be apparent from the following description taken in connection with the accompanying drawing wherein:

FIG. 1 is a perspective view of a brewing apparatus embodying the invention;

FIG. 2 is a fragmentary vertical section illustrating the arrangement of the improved venting means; and FIG. 3 is a fragmentary horizontal section thereof.

DESCRIPTION OF THE PREFERRED EMBODIMENT

In the exemplary embodiment of the invention as disclosed in the drawing, a beverage brewing apparatus generally designated 10 illustratively comprises a coffee brewer. As shown in FIG. 1, the brewer may include a base portion 11, an upright rear portion 12, and one or more head portions 13. In the illustrated embodiment, a pair of head portions 13 is shown, it being understood that any suitable number may be utilized as desired. The base may be provided with a plurality of warmer stations 14 and suitable controls 15 and 16 may be provided for controlling the operation of the apparatus. The heads 13 may be provided with additional warmer stations 17, as desired.

The present invention is concerned with the provision of the hot brewing water for use in brewing coffee in the apparatus. As shown in FIG. 2, the coffee beverage may be brewed in a cartridge 18 which is removably supported on a lower wall 19 of the head 13 in a front portion 20 thereof forwardly of the rear upright 12. The cartridge defines a brewing chamber 21 in which a suitable filter 22 and ground coffee 23 may be placed. The coffee beverage is produced by delivering hot water into the brewing space 21 and for this purpose, a spray head device 24 is mounted to the head wall 19 so as to deliver the water in a uniform distribution downwardly into the brewing chamber onto the ground coffee 23 therein, as best seen in FIG. 2.

As indicated above, brewing apparatus 10 may comprise an "instantaneous-type" water heating means generally designated 25 wherein cold water is delivered through an inlet duct 26 to be heated to the desired brewing temperature and delivered as hot water from an outlet 27 of the heating means through a delivery duct 28 to a connection 29 to the spray head 24.

Water heating means 25 herein comprises a plurality of individual heat transfer devices illustratively generally designated 30 and 31. In the illustrated embodiment, each of the heating devices is identical. As shown, each device includes a massive heat transfer body 32, an electrical heating element 33 interconnected with controls 16 through electrical conductors 34. Operation of the heating element 33 may be controlled by a conventional thermostatic switch 35 and an overriding safety thermostatic switch 36 electrically connected to control 16 in the conventional manner.

As best seen in FIG. 3, the upper surface of each heat transfer element 32 is provided with a spiral upwardly opening groove 37 for channeling the incoming water to a plurality of through passages 38. The passages 38 open downwardly into a discharge chamber element 39, such as shown with respect to the lower heat transfer device 31 in FIG. 2. In flowing through the grooves 37 and passages 38, the water is heated by heat transfer association with the heated heat transfer body. The water is sequentially delivered from each superjacent heat transfer body to the subjacent transfer body through an intermediate transfer chamber element 53 so that a succession of heating operations is effected on the water until the water reaches the desired brewing temperature. In the illustrated embodiment, two such heating devices are arranged in stacked relationship to provide the necessary elevation in temperature of water provided from a conventional pressurized source, it being understood that any number of heat transfer elements may be utilized in the overall water heating means 25, as desired.

As indicated above, it is desired that the water be heated by heat transfer devices uniformly in passing through the successive heat transfer bodies with effectively minimized vaporization. Illustratively, in the brewing of coffee, it is desired that the water be heated to approximately 190° to 200° F. for optimum brewing and, thus, in normal operation, the water need not be heated to above boiling temperature. However, as discussed above, as the heat transfer bodies are heated to a higher temperature, some vaporization may take place where, for any reason, the transfer of the water through the devices is slowed down from the normal rate. Thus, should any of the flow passages 38 be partially blocked as from scale or the like, it is desired that any vaporization which may be effected be suitably safely vented. For this purpose, improved vent means generally designated 40 are provided herein.

As shown in FIGS. 2 and 3, vent means 40 comprises a plurality of individual vents 41 and 42 connected respectively to the heat transfer bodies 31 and 32. Vent 41 is connected by means of an elbow 43 to a horizontally extending nipple 44 opening into the space 45 within the heat transfer body 32 above the groove 37. The vent further defines a suitable tube 46 which, in the illustrated embodiment, is formed of a synthetic resin and which defines a distal end 47 which is connected to the spray head dome 52 by suitable connector 48 adjacent the hot water delivery connector 29. Similarly, the vent 42 includes a synthetic resin tube 49 connected through an elbow 50 and connector (not shown) horizontally to the interior space of the lower heat transfer body 31. The distal end 51 of the conduit 49 is connected through a suitable connector (not shown) to the spray head dome 52 adjacent the connection of the hot water delivery tube 28 thereto, as further shown in FIG. 3. Thus, each of the vent tubes is connected to vent from the respective heat transfer body to the interior of the brewing chamber 21 through the spray head dome 52 so that any liquid discharged from the heat transfer bodies is directed into the brewing chamber for use in effecting the brewing operation. As seen in FIG. 2, the connections 48 to the spray head dome from the individual conduits is vertical so as to assure a draining of all such liquid into the brewing chamber in the operation of the device.

It has been found that the utilization of the dual venting means in the apparatus 10 provides an improved flow control in the apparatus. Further, by connecting the vents to the dome 52 carrying the spray head 24 mounted above the wall 19, the vents are effectively recessed so as to avoid manual contact by the user therewith in installing and removing the cartridge 18 in the normal use thereof in preparing successive batches of coffee.

The disposition of the vent outlets 48 adjacent the spray head 24, as discussed above, further assures that in the event of any clogging of the respective devices, the water will be discharged into the brewing cartridge so as to avoid dangerous spillage thereof onto the electrical controls of the apparatus.

The flexibility of the ducts 46 and 49 permits facilitated manufacture and low cost. The venting of each of the heat transfer devices assures a distribution of pressure conditions within the overall water heating structure so as to provide improved water heating operation.

The coffee brewer apparatus of the present invention is extremely simple and economical of construction while yet providing the improved functioning discussed above.

The foregoing disclosure of specific embodiments is illustrative of the broad inventive concepts comprehended by the invention.

I claim:

1. In a coffee brewer having water heating means including a plurality of vertically juxtaposed heating devices each defined by a heat transfer mass and means for heating the mass, and a cartridge for receiving hot water from the heating means, the improvement comprising
a plurality of vent means for venting each of the heating devices individually into the interior of said cartridge.

2. The coffee brewer of claim 1 wherein said vent means comprises flexible conduit means connected between the heating devices and cartridges.

3. The coffee brewer of claim 1 wherein a spray head is provided at the top of the cartridge for spraying the hot water from the heating means in a desired distribution into the cartridge, and said vent means defines a plurality of outlet means adjacent the spray for venting the heating means thereto.

4. The coffee brewer of claim 1 wherein said vent means includes a first conduit connected between said first heating device and a first position at the cartridge and a second conduit connected between a second of said heating devices and a second position adjacent said first position.

5. The coffee brewer of claim 1 wherein a spray head is provided at the top of the cartridge for spraying the hot water from the heating means in a desired distribution into the cartridge, and said vent means includes a first conduit connected between said first heating device and a first position adjacent the spray head and a second conduit connected between a second conduit connected between a second of said heating devices and a second position adjacent said first position.

6. The coffee brewer of claim 1 wherein said vent means comprises a plurality of synthetic resin tubes.

7. The coffee brewer of claim 1 wherein said vent means defines horizontal outlets from the water heating means and vertical connections at the cartridge.

* * * * *